B. R. SIMMONS.
VALVE SPRING HOLDER.
APPLICATION FILED JULY 28, 1915.
1,191,240.
Patented July 18, 1916.
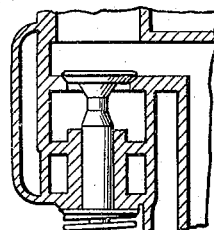
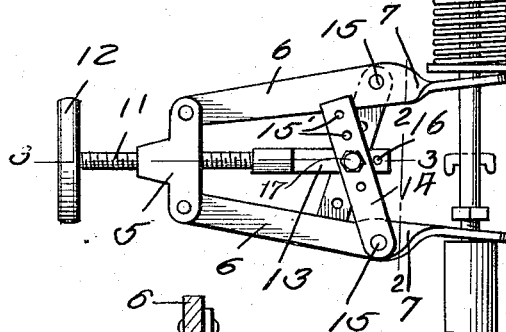
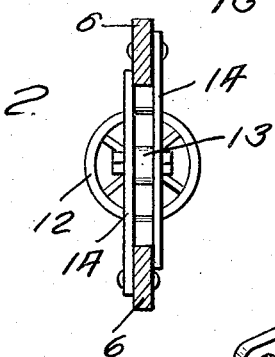
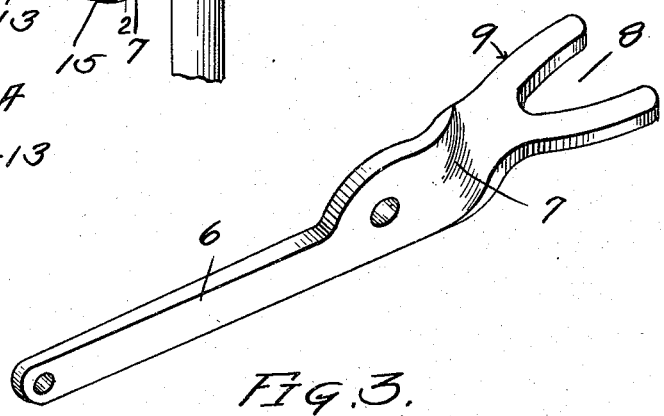
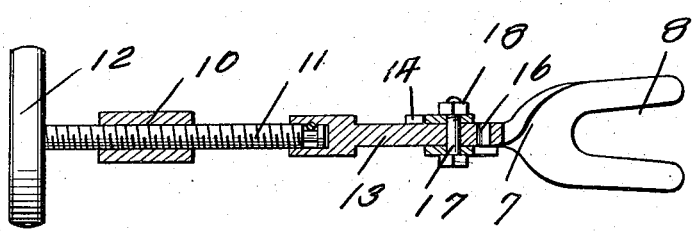
Inventor
B. R. Simmons

UNITED STATES PATENT OFFICE.

BERT R. SIMMONS, OF KANSAS CITY, KANSAS.

VALVE-SPRING HOLDER.

1,191,240.   Specification of Letters Patent.   Patented July 18, 1916.

Application filed July 28, 1915. Serial No. 42,408.

*To all whom it may concern:*

Be it known that I, BERT R. SIMMONS, a citizen of the United States, residing at Kansas City, in the county of Wyandotte, State of Kansas, have invented certain new and useful Improvements in Valve-Spring Holders; and I do hereby declare the following to be a full, clear, and exact description of the invention, such as will enable others skilled in the art to which it appertains to make and use the same.

This invention relates to new and useful improvements in devices for compressing and holding valve springs of the common type employed in connection with the valves of engines so that said springs may be readily removed or attached as desired, or held while repairs or adjustments are being made to the valve.

It is the object of the present invention to provide such a valve spring holder which may be readily adjusted so as to be adapted for various conditions of work and to engage springs of different lengths effectively for compression whereby the same tool may be used for different types of valve mechanisms.

With the above and other objects and advantages in view, the invention resides more particularly in the novel combination, formation and arrangement of parts as more fully described hereinafter and pointed out in the appended claim.

Reference is had to the accompanying drawings, wherein similar characters of reference designate corresponding parts throughout the several views, and in which:

Figure 1 is a side elevation of the improved device shown holding a valve spring. Fig. 2 is a sectional view on the line 2—2 of Fig. 1. Fig. 3 is a view taken longitudinally through the device on the line 3—3 of Fig. 2. Fig. 4 is a perspective view of one of the gripping arms of the device.

Referring now more particularly to the accompanying drawings the improved spring holding means is shown as comprising a head block 5 to which are pivoted the inner ends of a pair of gripping arms 6 having their outer end portions laterally twisted at 7 with their extremities bifurcated at 8 to embrace a valve stem so as to properly engage a spring for compression, the furcations of one of these arms as shown at 9 in Fig. 4 being divergent so as to properly engage with washers of different sizes which are used in place at the outer end of the spring. The head block 5 is provided with a bore 10 in which is threaded a feed screw 11 carrying at its outer end an operating wheel 12 and having its inner end swiveled to one end of a link 13 which extends between the arms 6. This link is adjustably connected to the outer ends of the arms by links 14, each having one end pivoted at 15 to a respective arm and having its other end provided with a series of openings 15' through one of which and through one of a series of openings 16 in the end of the link is pivotally passed a bolt 17 secured as by the nut 18 threaded thereon.

In the operation of the tool, it is positioned with its gripping arms disposed between the usual washer at the bottom of the valve spring, and the shoulder of the valve rod, and the feed screw is then turned to force the arms apart and compress the spring so that the usual key or pin which holds the spring may be readily removed or secured as desired to promote readily manipulation of the valve mechanism.

By positioning the bolt 17 differently in the series of openings of the links, the initial position of the arms with respect to the feed screws may be varied so that the device may be adapted for use under various conditions of service and with various types of valve mechanisms.

While I have illustrated and described a particular embodiment of my invention, I have merely done so for the sake of convenience and I do not wish to be limited to that particular embodiment of my invention, as it is obvious that numerous changes may be made within the details of construction thereof without in any way departing from the spirit of the invention or exceeding the scope of the appended claim.

What I claim is:—

A valve spring holder comprising a pair of members adapted to engage the ends of a spring, means for moving said members relatively to compress or expand the spring, and means adjustably connecting said members to said moving means whereby the initial relative positions of said members with respect to their operation by the moving means may be varied.

In testimony whereof, I affix my signature, in the presence of two witnesses.

BERT R. SIMMONS.

Witnesses:
W. E. BODLEY,
NELLIE M. SHINE.

Copies of this patent may be obtained for five cents each, by addressing the "Commissioner of Patents, Washington, D. C."